United States Patent [19]

Yoshida

[11] Patent Number: 4,530,953

[45] Date of Patent: Jul. 23, 1985

[54] POLYESTER RESIN COMPOSITION HAVING AN IMPROVED MOLD RELEASE PROPERTY

[75] Inventor: Tomohiko Yoshida, Kamakura, Japan

[73] Assignee: Mitsubishi Rayon Company Ltd., Tokyo, Japan

[21] Appl. No.: 599,578

[22] Filed: Apr. 12, 1984

[30] Foreign Application Priority Data

Apr. 15, 1983 [JP] Japan .................................. 58-65724

[51] Int. Cl.³ ........................... C08K 5/10; C08K 7/12; C08K 7/14; C08L 67/02
[52] U.S. Cl. ................................... 524/311; 264/300; 264/331.21; 524/306; 524/315; 524/318; 524/454; 524/494; 524/496; 524/605
[58] Field of Search .......................... 264/300, 331.21; 524/306, 311, 315, 318, 605

[56] References Cited

U.S. PATENT DOCUMENTS

| | | | |
|---|---|---|---|
| T871,008 | 2/1970 | McSpadden | 524/311 |
| 3,423,347 | 1/1969 | Zawadzki et al. | 524/311 |
| 4,274,987 | 6/1981 | Augustyn | 524/315 |
| 4,408,000 | 10/1983 | Lee | 524/311 |
| 4,419,478 | 12/1983 | Brandstetter et al. | 524/311 |

FOREIGN PATENT DOCUMENTS

| | | | |
|---|---|---|---|
| EP3156 | 7/1979 | European Pat. Off. | 524/311 |
| 3031491 | 4/1982 | Fed. Rep. of Germany | 524/311 |
| 2310403 | 12/1976 | France | 524/311 |
| 53-73242 | 6/1978 | Japan | 524/306 |

*Primary Examiner*—Ronald W. Griffin
*Attorney, Agent, or Firm*—Cushman, Darby & Cushman

[57] ABSTRACT

An inorganic fiber-reinforced polyester resin composition having an improved mold-release property comprises 5% to 60% by weight of inorganic fibers, 0.01% to 2% by weight of at least one esters of pentaerythritol with saturated aliphatic monocarboxylic acids having 10 to 30 carbon atoms, and a balance of polyethylene terephthalate resin.

8 Claims, No Drawings

POLYESTER RESIN COMPOSITION HAVING AN IMPROVED MOLD RELEASE PROPERTY

BACKGROUND OF THE INVENTION

1. Field of the Invention

The present invention relates to a polyester resin composition. More particularly, the present invention relates to a polyester resin composition reinforced with inorganic fibers and having an improved mold release property.

2. Description of the Prior Art

It is well known that polyester resins, especially polyethylene terephthalate resins, exhibit very superior chemical and physical properties and thus are highly useful as various fibers, films, and engineering plastics. Utilization of the polyester resins as engineering plastics has recently been increasing and is expected to increase even further in the future.

In the production of engineering plastic articles from a polyester resin composition by means of a molding process, it is important to increase the mold release property of the molded article so as to minimize the molding cycle time. For this purpose, a specific agent for increasing the mold release property is usually added to the polyester resin composition.

There are many different mold release agents in practical use. However, conventional mold release agents are sometimes disadvantageous. For example, some conventional mold release agents highly effective for improving the mold release property of a polyester resin composition decrease the mechanical strength of the molded article or discolor the molded article by gases generated therefrom.

Other conventional mold release agents, which do not degrade the mechanical strength and appearance of the molded article, do not satisfactorily improve the mold release property of the polyester resin composition and sometimes cause undesirable irregular noise (creaky noise) during the molding procedure.

Under the above-mentioned circumstances, it is strongly desired, especially in the field of high cycle molding resin compositions, to provide a new type of polyester resin composition free from the above-mentioned disadvantages.

SUMMARY OF THE INVENTION

An object of the present invention is to provide a polyester resin composition reinforced with inorganic fibers and having an improved mold release property.

Another object of the present invention is to provide a polyester resin composition useful for producing molded articles having a satisfactory mechanical strength and appearance.

Still another object of the present invention is to provide a polyester resin composition capable of forming a molded article without undesirable irregular noise during the molding procedure.

The above-mentioned objects can be attained by the polyester resin composition of the present invention, which comprises 5% to 60% by weight of inorganic fibers; 0.01% to 2% by weight of at least one ester compound of the formula (I):

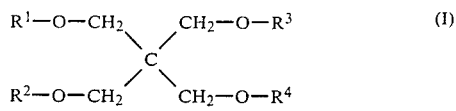

wherein $R^1$, $R^2$, $R^3$, and $R^4$ respectively represent, independently from each other, a member selected from the group consisting of a halogen atom and alkyl carbonyl radicals of the formula $C_nH_{2n+1}CO-$ wherein n represents an integer of from 10 to 30, at least one member of $R^1$, $R^2$, $R^3$, and $R^4$ representing the alkyl carbonyl radical; and a balance of a polyethylene terephthalate resin.

DESCRIPTION OF THE PREFERRED EMBODIMENTS

The polyester resin composition of the present invention comprises specific amounts of inorganic fibers and at least one specific pentaerythritol ester compound evenly contained in a matrix comprising a polyethylene terephthalate resin.

The polyethylene terephthalate resin comprises at least one member selected from the group consisting of linear polyethylene terephthalate homopolymers and polyethylene terephthalate copolymers containing at least 60 molar % of ethylene terephthalate units.

The polyethylene terephthalate copolymer may contain a small amount, preferably, 40 molar % or less, of at least one additional copolymerization component other than ethylene glycol and terephthalic acid. The additional copolymerization components may be selected from dicarboxylic acids such as isophthalic acid, naphthalene-1,4- or -2,6-dicarboxylic acids, diphenylether-4,4'-dicarboxylic acid, adipic acid, and sebacic acid; glycol components such as propylene glycol, butylene glycol, diethylene glycol, neopentylglycol, cyclohexane dimethanol, and 2,2-bis(4-hydroxyphenyl) propane; and hydroxyl acid components such as p-hydroxy benzoic acid and p-hydroxyethoxy benzoic acid.

The polyethylene terephthalate resin can be produced by a conventional ester-exchange reaction procedure and polycondensation reaction procedure or by a conventional direct esterifying reaction procedure and polycondensation reaction procedure. It is preferable that the polyethylene terephthalate have an intrinsic viscosity $[\eta]$ of from 0.4 to 1.4, determined in a solvent consisting of 50 parts of weight of phenol and 50 parts by weight of tetrachloroethane at a temperature of 25° C. When a polyethylene terephthalate resin having a high intrinsic viscosity is desired the polyethylene terephthalate resin produced by the above-mentioned conventional procedures may be subjected to an additional solid phase polycondensation process.

The polyester resin composition of the present invention contains inorganic fibers in an amount of from 5% to 60% by weight. When the amount of the inorganic fibers is more than 60% by weight, the resultant resin composition exhibits a decreased fluidity and, therefore, an unsatisfactory molding property. An amount of inorganic fibers of less than 5% by weight results in an unsatisfactory reinforcing effect of the inorganic fibers on the resultant resin composition.

The inorganic fibers usable for the present invention are not limited to those of a special type. That is, the inorganic fibers may be selected from glass fibers, carbon fibers, and asbestos fibers. The glass fibers may be selected from conventional roving strand type and chopped strand type glass fibers. In view of the productivity of the polyester resin composition, the chopped strand type glass fibers are preferable for the present invention.

The inorganic fibers can be mixed into the polyester resin matrix by any conventional mixing method. In consideration of workability of the inorganic fibers-polyester resin mixture, wear of the molding machine due to the mixture, and breakage of the inorganic fibers in the molding procedure, it is preferable that the original length of the inorganic fibers to be mixed into the polyester resin be in the range of from 0.4 to 6 mm so as to cause the length of the inorganic fibers distributed in the resultant molded resin article to be in the range of from 0.2 to 2 mm, which is long enough to satisfactorily reinforce the resultant molded resin article.

Usual commercially available inorganic fibers which have been treated by various methods may be used for the present invention without applying further treatment thereto.

In the present invention, it is essential that the polyester resin composition contain 0.01% to 2% by weight of at least one ester compound of the formula (I) in addition to the polyethylene terephthalate resin and the inorganic fibers.

The ester compound of the formula (I) is selected from mono-, di-, tri-, and tetra-ester compounds of pentaerythritol with saturated aliphatic monocarboxylic acids having 10 to 30 carbon atoms. The saturated aliphatic monocarboxylic acid is selected preferably from the group consisting of lauric acid, mylistic acid, palmitic acid, stearic acid, arachic acid, cerotic acid, melissic acid, and n-hentriacontanic acid.

The ester compound of the formula (I) is used as a mold release agent for the polyester resin composition. The mold release agent may consist of a single type of the ester compound or a mixture of two or more different types of the ester compounds.

When the amount of the ester compound mixed into the polyester resin composition is less than 0.01% by weight, the resultant composition exhibits an unsatisfactory mold release property. If the amount of the ester compound is more than 2% by weight, the resultant molded article is discolored by gases generated from the ester compound during the molding procedure and has a decreased mechanical strength.

The polyester resin composition of the present invention may be mixed with a certain amount of an additive, for example, at least one member selected from fillers such as talc, mica, glass foil, clay, and kaolin; stabilizers for light and/or heat; coloring materials such as dyes and pigments; flame-retardants; nucleating agents; crystallization accelerators; and delusterants.

The polyester resin composition of the present invention can be prepared, for example, by mixing predetermined amounts of the polyethylene terephthalate resin, preferably dried, inorganic fibers, and mold release agent consisting of one or more ester compounds of the formula (I) by means of a usual mixer, for example, a tumbler mixer; by melt-kneading the mixture by means of a extruder or kneader; and, if necessary, by pelletizing the melt-kneaded mixture.

The present invention will be further explained in the following examples, which are representative rather than restrictive of the scope of the present invention.

EXAMPLES 1 to 25

In each of Examples 1 to 25, a polyethylene terephthalate homopolymer having an intrinsic viscosity of 0.78 determined in a solvent consisting of 50 parts by weight of tetrachloroethane and 50 parts by weight of phenol at 25° C., was mixed with chopped strand type glass fibers having a length of 3 mm in the amount indicated in Table 1, a mold release agent consisting of the ester compound of the type indicated in Table 1 in the amount indicated in Table 1, and, optionally, a filler consisting of the inorganic material indicated in Table 1 in the amount indicated in Table 1 by means of a tumbler mixer. The mixture was melt-kneaded in an extruder at a cylinder temperature of 280° C. and extruded to provide molding pellets of the resultant polyester resin composition.

The resultant polyester resin composition pellets were dried by hot air at a temperature of 150° C. for 4 hours.

The dried pellets were fed into a screw in-line type injection molding machine equipped with a cylinder having a diameter of 30 mm and a capacity of three ounces, was melted at a cylinder temperature of 270° C., and was injection molded at a mold temperature of 80° C. to provide bending test specimens having a thickness of 3.2 mm. The specimens were subjected to a flexual strength test in accordance with ASTM D790.

The mold release property of the resultant polyester resin composition was determined as follows. The molding pellets were dried with hot air at a temperature of 150° C. for 4 hours. The dried pellets were immediately fed into an injection molding machine having a capacity of 8 ounces and were melted at a cylinder temperature of 280° C. The melt was injection molded at a mold temperature of 140° C. and was cooled in the mold for 30 seconds to solidify it. The resultant product was in the form of a box having an outer length of 100 mm, a width of 120 mm, and a height of 40 mm.

In the injection molding procedure, a pressure sensing device (strain gauge) was placed between an extruding plate and an extruding pin in the mold. When one cycle of the injection molding operation was completed, the mold was opened and a force necessary for ejecting the resultant molded article from the mold, that is, a resistance of the molded article to ejection, was measured by means of the pressure sensing device and an autograph connected to the sensing device.

The smaller the resistance to ejection, the higher the mold release property of the polyester resin composition.

Discoloration of the molded article due to gases generated from the mold-release agent was observed.

The properties of the resultant polyester resin compositions are shown in Table 1.

COMPARATIVE EXAMPLES 1 to 8

In each of Comparative Examples 1 to 8, the same procedures as those described in Example 1 were carried out, with the following exceptions.

In Comparative Example 1, no filler and no mold release agent were added to the polyester resin composition.

In Comparative Example 2, a filler consisting of 15% by weight of talc was used. No mold release agent was added.

In Comparative Example 3, a filler consisting of 20% by weight of mica was used. No mold release agent was added.

In Comparative Example 4, 0.1% by weight of stearic acid was used as a mold release agent.

In Comparative Example 5, 0.1% by weight of methyl stearate was used as a mold release agent.

In Comparative Examples 6 and 7, a mold release agent consisting of pentaerythritol tetrastearate was used in amounts of 0.001% and 3% by weight, respectively.

In Comparative Example 8, a large amount, 5% by weight, of pentaerythritol monostearate was used as a mold release agent.

The molded articles of Comparative Examples 4 and 5, which contained a mold release agent other than that of the present invention, exhibited a poor mold release property.

In Comparative Example 6, the resultant molded article, which contained pentaerythritol tetrastearate in a very small amount of 0.001% by weight, exhibited a poor mold release property.

In Comparative Examples 7 and 8, the resultant molded articles, which contained the mold release agent in excessively large amounts of 3% and 5% by weight, respectively, were discolored brown due to gases derived from the mold release agent during the molding procedure.

TABLE 1

| Example No. | Amount of glass fiber (wt %) | Filler Type | Filler Amount (wt %) | Mold release agent Type of ester compound | Mold release agent Amount (wt %) | Flexural strength (kg/cm$^2$) | Mold release property (ejection resistance) (kg/cm$^2$) | Discoloration due to generated gases |
|---|---|---|---|---|---|---|---|---|
| Example | | | | | | | | |
| 1 | 30 | — | — | Pentaerythritol tetrastearate | 0.02 | 2450 | 115 | None |
| 2 | " | — | — | " | 0.1 | " | 105 | " |
| 3 | " | — | — | " | 0.2 | " | 95 | " |
| 4 | " | — | — | " | 0.5 | 2430 | 90 | " |
| 5 | " | — | — | " | 1.0 | 2380 | 85 | " |
| 6 | " | — | — | " | 1.8 | 2350 | 80 | " |
| 7 | 10 | Talc | 15 | " | 0.5 | 1650 | 89 | " |
| 8 | 5 | " | 20 | " | " | 1270 | 90 | " |
| 9 | 10 | Mica | " | " | " | 1750 | " | " |
| 10 | " | Wollastonite | 30 | " | " | 1500 | 88 | " |
| 11 | " | " | 50 | " | " | 1550 | " | " |
| 12 | 15 | — | — | " | " | 1700 | " | " |
| 13 | 20 | — | — | " | " | 2000 | 89 | " |
| 14 | 30 | — | — | Pentaerythritol tristearate | 0.2 | 2440 | 95 | " |
| 15 | " | — | — | " | 0.6 | 2420 | 88 | " |
| 16 | " | — | — | Pentaerythritol distearate | 0.2 | " | 95 | " |
| 17 | " | — | — | " | 0.6 | 2400 | 87 | " |
| 18 | " | — | — | Pentaerythriol monostearate | 0.2 | 2390 | 96 | " |
| 19 | 30 | — | — | Pentaerythritol monomyristate | 0.5 | 2450 | 89 | None |
| 20 | " | — | — | Pentaerythritol dipalmitate | " | 2430 | 90 | " |
| 21 | " | — | — | Pentaerythritol monononadecylate | " | 2440 | 89 | " |
| 22 | " | — | — | Pentaerythritol dibehenate | " | 2410 | " | " |
| 23 | " | — | — | Pentaerythritol dimontanate | " | 2420 | 90 | " |
| 24 | " | — | — | Pentaerythritol trimontanate | " | 2430 | " | " |
| 25 | " | — | — | Pentaerythritol monomelissinate | " | 2400 | 91 | " |
| Comparative Example | | | | | | | | |
| 1 | 30 | — | — | — | — | 2460 | 136 | None |
| 2 | 10 | Talc | 15 | — | — | 1660 | 135 | " |
| 3 | " | Mica | 20 | — | — | 1750 | 134 | " |
| 4 | 30 | — | — | Stearic acid | 0.1 | 2300 | 135 | " |
| 5 | " | — | — | Butyl stearate | " | 2360 | 133 | " |
| 6 | " | — | — | Pentaerythritol tetrastearate | 0.001 | 2460 | 130 | " |
| 7 | " | — | — | " | 3 | 2200 | 70 | Discolored brown |
| 8 | " | — | — | Pentaerythritol monostearate | 5 | 1900 | 60 | Discolored brown |

Table 1 clearly shows that all the molded polyester resin compositions of Examples 1 to 25 prepared in accordance with the present invention exhibited an excellent mold release property, a satisfactory mechanical strength, and no discoloration. That is, the specific mold release agent of the present invention does not cause the resultant molded article to exhibit a decreased mechanical strength or discoloration. Also, no irregular noise was made during the molding procedures.

The molded articles of Comparative Examples 1 to 3, which contained no mold release agent of the present invention, exhibited a large ejection resistance, that is, a poor mold release property.

I claim:

1. A polyester resin composition comprising 5% to 60% by weight of inorganic fibers; 0.01% to 2% by weight of at least one ester compound of the formula (I):

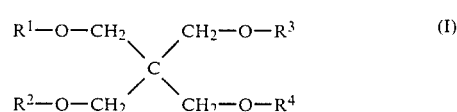

wherein $R^1$, $R^2$, $R^3$, and $R^4$ respectively represent, independently from each other, a member selected from the group consisting of a hydrogen atom and alkyl carbonyl radicals of the formula $C_nH_{2n+1}CO-$ wherein n represents an integer of from 10 to 30, at least one member of $R^1$, $R^2$, $R^3$, and $R^4$ representing said alkyl carbonyl radical; and a balance of a polyethylene terephthalate resin.

2. The composition as claimed in claim 1, wherein said polyethylene terephthalate resin comprises at least one member selected from the group consisting of linear polyethylene terephthalate homopolymers, and polyethylene terephthalate copolymers containing at least 60 molar % of ethylene terephthalate units.

3. The composition as claimed in claim 1, wherein said polyethylene terephthalate resin has an intrinsic viscosity $[\eta]$ of from 0.4 to 1.4 determined in a solvent consisting of 50 parts by weight of phenol and 50 parts by weight of tetrachloroethane at a temperature of 25° C.

4. The composition as claimed in claim 1, wherein said inorganic fibers have a length of from 0.4 to 6 mm.

5. The composition as claimed in claim 1, wherein said ester compound of the formula (I) is selected from mono-, di-, tri- and tetra-esters of pentaerythritol with at least one saturated aliphatic monocarboxylic acid having 10 to 30 carbon atoms.

6. The composition as claimed in claim 1, wherein said ester compound of the formula (I) is selected from the group consisting of pentaerythritol mono-, di-, tri-, and tetra-stearates; pentaertyritol mono-, di-, tri-, and tetra-myristates; pentaerythritol mono-, di, tri-, and tetra-palmitates; pentaerythritol mono-, di-, tri-, and tetra-nonadecylates; pentaerythritol mono-, di-, tri-, and tetra-behenates; pentaerythritol mono-, di-, tri-, and tetra-montanates; and pentaerythritol mono-, di-, tri-, and tetra-melissinates.

7. The composition as claimed in claim 1, wherein said inorganic fibers are selected from the group consisting of glass fibers, carbon fibers, and asbestos fibers.

8. A method for improving the mold release properties of a polyester resin composition containing polyethylene terephthalate resin and 5% to 60% by weight inorganic fibers comprising mixing at the same time together with the resin and the fibers from 0.01% to 2% by weight as a mold release agent at least one ester compound of the formula (I):

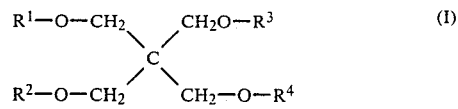

wherein $R^1$, $R^2$, $R^3$, and $R^4$ respectively represent, independently from each other, a member selected from the group consisting of a hydrogen atom and alkyl carbonyl radicals of the formula $C_nH_{2n+1}CO-$ wherein n represents an integer of from 10 to 30, at least one member of $R^1$, $R^2$, $R^3$, and $R^4$ represents said alkyl carbonyl radical.

* * * * *